United States Patent
Seki et al.

(10) Patent No.: US 9,723,665 B2
(45) Date of Patent: Aug. 1, 2017

(54) REDUCED FLICKERING LIGHTING APPARATUS AND LUMINAIRE

(71) Applicant: Panasonic Intellectual Property Management Co., Ltd., Osaka (JP)

(72) Inventors: Keisuke Seki, Osaka (JP); Takeshi Kamoi, Kyoto (JP); Daisuke Yamahara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/822,054

(22) Filed: Aug. 10, 2015

(65) Prior Publication Data
US 2016/0066388 A1    Mar. 3, 2016

(30) Foreign Application Priority Data

Aug. 27, 2014  (JP) ................. 2014-173044

(51) Int. Cl.
  *H02M 3/335*  (2006.01)
  *H05B 33/08*  (2006.01)
  *H05B 37/02*  (2006.01)

(52) U.S. Cl.
  CPC .... *H05B 33/0815* (2013.01); *H02M 3/33546* (2013.01); *H05B 37/0227* (2013.01); *Y02B 20/346* (2013.01)

(58) Field of Classification Search
  CPC ............ H05B 33/0875; H05B 33/0887; H05B 33/0815; H05B 33/0851; H05B 33/0839; H05B 6/682
  See application file for complete search history.

(56) References Cited

U.S. PATENT DOCUMENTS 6,304,462 B1 * 10/2001 Balakrishnan .... H02M 3/33507
                                                           363/21.01
8,860,319 B2    10/2014 Naruo
(Continued)

FOREIGN PATENT DOCUMENTS

EP    2 519 079 A1    10/2012
JP    2011-100666 A    5/2011
(Continued)

OTHER PUBLICATIONS

FA5601 Application Note (FUJI Power Supply Control IC, Power Factor Correction), Fuji Electric Co., Ltd., Apr. 2011.

*Primary Examiner* — Tung X Le
*Assistant Examiner* — Raymond R Chai
(74) *Attorney, Agent, or Firm* — Renner, Otto, Boisselle & Sklar, LLP

(57) ABSTRACT

Lighting apparatus includes: AC/DC converter which converts AC voltage Vac to DC voltage Vdc; DC/DC converter which converts DC voltage Vdc to a DC voltage to be applied to LED; and detection circuit which detects AC voltage Vac. DC/DC converter includes switching element, and control circuit that performs a control of repeatedly turning on and off switching element in a boundary conduction mode. Control circuit performs the control under which ON time Ton is kept from exceeding an upper limit that is previously determined, and raises the upper limit when AC voltage Vac detected by detection circuit falls below a predetermined value. ON time Ton is a period of time during which switching element is kept ON.

9 Claims, 13 Drawing Sheets

(56) References Cited

U.S. PATENT DOCUMENTS

| | | | |
|---|---|---|---|
| 2008/0224635 A1* | 9/2008 | Hayes | H05B 37/02 315/297 |
| 2010/0207455 A1* | 8/2010 | Erickson, Jr. | G05F 1/67 307/82 |
| 2012/0217873 A1 | 8/2012 | Tanaka | |
| 2012/0242246 A1 | 9/2012 | Naruo | |
| 2012/0248998 A1 | 10/2012 | Yoshinaga | |
| 2013/0026937 A1 | 1/2013 | Nakajo et al. | |
| 2013/0329468 A1* | 12/2013 | Yang | H02M 3/33523 363/21.15 |
| 2014/0077719 A1* | 3/2014 | Fukuda | H05B 33/08 315/224 |
| 2014/0211519 A1* | 7/2014 | Hsu | H02M 1/4258 363/21.17 |
| 2015/0280592 A1* | 10/2015 | Hu | H02M 3/156 363/21.04 |
| 2016/0057825 A1* | 2/2016 | Hu | H05B 33/0815 315/201 |
| 2016/0087537 A1* | 3/2016 | Barkley | H02M 3/33507 363/21.12 |
| 2016/0143104 A1* | 5/2016 | Chen | H05B 33/0815 315/200 R |
| 2016/0156269 A1* | 6/2016 | Hu | H02M 3/33507 315/294 |

FOREIGN PATENT DOCUMENTS

| | | | |
|---|---|---|---|
| JP | 2012-199002 A | 10/2012 | |
| JP | 2012-204360 A | 10/2012 | |
| JP | 2012-216766 A | 11/2012 | |
| JP | 2013-030416 A | 2/2013 | |

\* cited by examiner

REDUCED FLICKERING LIGHTING APPARATUS AND LUMINAIRE

CROSS REFERENCE TO RELATED APPLICATION

This application claims the benefit of priority of Japanese Patent Application Number 2014-173044, filed Aug. 27, 2014, the entire content of which is hereby incorporated by reference.

BACKGROUND OF THE INVENTION

1. Field of the Invention

The present disclosure relates to a lighting apparatus which supplies a current to a solid-state light-emitting device, and a luminaire including the lighting apparatus.

2. Description of the Related Art

As a lighting apparatus which supplies a current to a solid-state light-emitting device such as an LED (light-emitting diode), an apparatus which includes an AC/DC converter and a DC/DC converter connected to the AC/DC converter has been proposed (see, for example, Patent Literature 1: Japanese Unexamined Patent Application Publication No. 2013-30416).

In the lighting apparatus according to Patent Literature 1, the DC/DC converter includes a chopper circuit having a switching element that switches (turns on and off repeatedly) in BCM (boundary conduction mode), an inductor, etc. It is to be noted that the BCM is an operation mode in which a switching element is turned on when a current flowing through the inductor reaches zero in switching of the DC/DC converter. In a DC/DC converter of this type, in order to keep an output current constant, an ON time which is a period of time during which an ON state of the switching element is maintained varies depending on a DC voltage provided to the DC/DC converter. Specifically, ON time Ton of the switching element is represented by Expression 1 below.

$$Ton = 2Iout \cdot L/(Vdc - Vf)$$  Expression 1

Here, Iout denotes an output current of the DC/DC converter. L denotes inductance of an inductor included in the DC/DC converter. Vdc denotes a DC voltage provided to the DC/DC converter. Vf is a DC voltage (forward voltage) applied to a solid-state light-emitting device connected to an output terminal of the DC/DC converter.

As shown in the above-described Expression 1, for example, ON time Ton increases when DC voltage Vdc decreases, thereby keeping the output current Iout constant.

When ON time Ton excessively increases, however, a switching frequency decreases and enters an audible frequency band, causing sounding. For that reason, with the DC/DC converter including a switching element that operates in BCM, the ON time of the switching element is controlled such that the ON time of the switching element is kept from exceeding a predetermined upper limit.

SUMMARY OF THE INVENTION

However, the conventional lighting apparatus as described above which includes the DC/DC converter that performs control under which an upper limit is set on the ON time of the switching element poses a problem as described below. When momentary power failure (instantaneous power failure) or momentary voltage drop (instantaneous voltage drop) occurs in a commercial power supply that supplies power to the AC/DC converter, there is a problem that a current supplied to a solid-state light-emitting device temporarily decreases, and light emission of the solid-state light-emitting device also temporarily decreases accordingly, leading to flickering.

The following describes the reason. When momentary power failure or momentary voltage drop occurs, DC voltage Vdc that is an output of the AC/DC converter decreases, and ON time Ton of the switching element starts to increase. However, ON time Ton reaches the upper limit, and thus ON time Ton that is sufficient for maintaining the output of a constant current cannot be secured, leading to reduction in the current supplied to the solid-state light-emitting device. Thus, there is a problem that flicker occurs when momentary power failure or momentary voltage drop occurs.

In order to solve the above-described conventional problem, an object of the present disclosure is to provide a lighting apparatus and the like which include a DC/DC converter having an upper limit on ON time of a switching element, with less possibility of occurrence of flickering even when momentary power failure or momentary voltage drop occurs.

In order to achieve the above-described object, the lighting apparatus according to an aspect of the present disclosure is a lighting apparatus which supplies a current to a solid-state light-emitting device. The lighting apparatus includes: an AC/DC converter which converts an AC voltage to a first DC voltage; a DC/DC converter which converts the first DC voltage to a second DC voltage to be applied to the solid-state light-emitting device; and a detection circuit which detects at least one of the AC voltage and the first DC voltage, wherein the DC/DC converter includes a switching element, and a control circuit that performs a control of repeatedly turning on and off the switching element in a boundary conduction mode, and the control circuit performs the control under which an ON time is kept from exceeding an upper limit that is previously determined, and raises the upper limit when the at least one of the AC voltage and the first DC voltage detected by the detection circuit falls below a predetermined value, the ON time being a period of time during which switching element is kept ON.

In addition, in order to achieve the above-described object, the luminaire according to an aspect of the present disclosure includes the above-described lighting apparatus and a solid-state light-emitting device which is supplied with a current from the lighting apparatus.

With the lighting apparatus and the luminaire according to the present disclosure, it is possible to suppress flickering even when momentary power failure or momentary voltage drop occurs in the lighting apparatus including a DC/DC converter having an upper limit on ON time of the switching element.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE PREFERRED EMBODIMENTS

The following describes in detail a lighting apparatus and a luminaire according to an aspect of the present disclosure, with reference to the drawings.

It is to be noted that embodiments described below each indicate one specific example of the present disclosure. Numerical values, structural elements, the arrangement and connection of the structural elements, operation timing, and so on shown in the following embodiments are mere examples, and therefore do not limit the scope of the present disclosure. In addition, among the structural elements in the following embodiments, elements not recited in any one of the independent claims which indicate the broadest concepts of the present disclosure are described as arbitrary structural elements.

Embodiment 1

First, a lighting apparatus according to Embodiment 1 of the present disclosure will be described.

Figure 1:
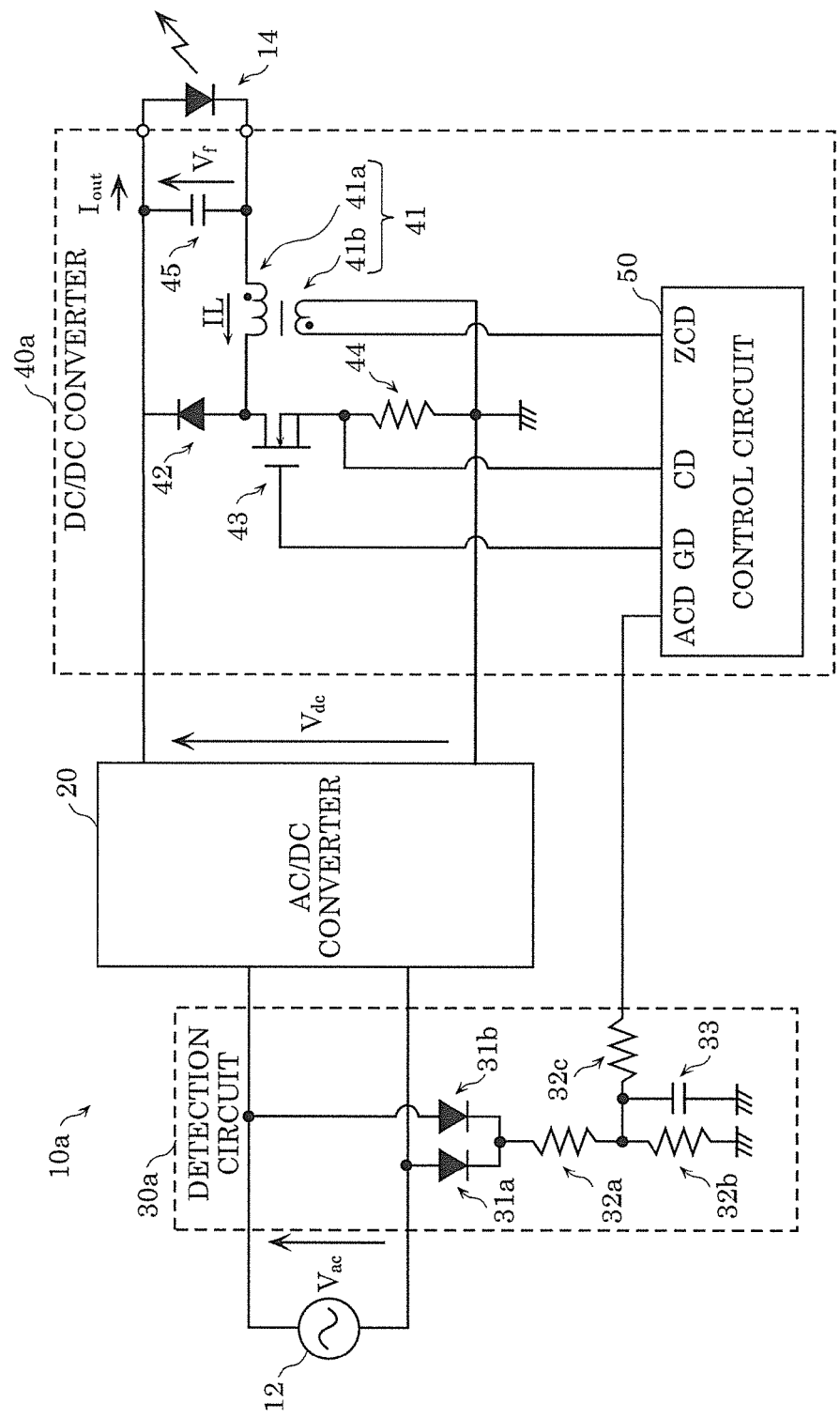
FIG. 1 is a circuit diagram of a lighting apparatus according to Embodiment 1 of the present disclosure.

FIG. 1 is a circuit diagram of lighting apparatus 10a according to Embodiment 1 of the present disclosure. FIG. 1 also illustrates AC power supply 12 (a commercial power supply, for example) which generates an AC voltage provided to lighting apparatus 10a, and LED 14 which is an example of a solid-state light-emitting device to which a current output from lighting apparatus 10a is supplied.

As illustrated in FIG. 1, lighting apparatus 10a is an apparatus which supplies a current (output current Iout) to LED 14, and includes AC/DC converter 20, detection circuit 30a, and DC/DC converter 40a.

AC/DC converter 20 is a circuit which converts an AC voltage to a first DC voltage. AC/DC converter 20 converts AC voltage Vac, which is provided from AC power supply 12, to DC voltage Vdc, according to the present embodiment. AC/DC converter 20 includes a diode bridge which rectifies provided AC voltage Vac, a capacitor which smoothes the rectified voltage, etc. It is to be noted that AC/DC converter 20 may be a circuit of any system as long as the circuit converts an AC voltage to a DC voltage, and may be a switching converter, or a circuit including a rectifier circuit and a smoothing circuit, for example.

Detection circuit 30a is an example of a circuit which detects an AC voltage provided to AC/DC converter 20 or a first DC voltage output from AC/DC converter 20, and detects AC voltage Vac provided to AC/DC converter 20, according to the present embodiment. Detection circuit 30a includes: rectifiers (diodes 31a and 31b) each of which converts AC voltage Vac to a DC voltage; voltage dividers (resistors 32a and 32b); a smoothing circuit (capacitor 33); and protective resistance 32c.

DC/DC converter 40a is an example of a circuit which converts the first DC voltage to a second DC voltage to be applied to a solid-state light-emitting device, and is a buck converter which converts DC voltage Vdc to a DC voltage to be applied to LED 14 (forward voltage Vf of LED 14), according to the present embodiment. DC/DC converter 40a includes: inductor 41; diode 42; switching element 43; resistor 44; capacitor 45; and control circuit 50. Inductor 41 is a choke coil including: primary coil 41a which accumulates or releases energy in response to switching of switching element 43; and secondary coil 41b for detecting the state where a current flowing through primary coil 41a reaches zero (zero current). Diode 42 is included in a circuit loop together with LED 14 and inductor 41, and is a rectifier which regenerates energy accumulated in primary coil 41a of inductor 41. Switching element 43 is an element which performs switching (turns on and off repeatedly) under the control of control circuit 50, and is an NMOS transistor connected in series to primary coil 41a of inductor 41, according to the present embodiment. Resistor 44 which is connected in series to switching element 43 is a sensing resistor for detecting a current flowing through switching element 43. Capacitor 45 is connected in parallel to LED 14, and smoothes a ripple voltage which is generated in inductor 41 and diode 42.

Control circuit 50 is a circuit which performs a control of repeatedly turning on and off switching element 43 (causes switching element 43 to perform switching) in BCM, and thereby supplies LED 14 with a constant current (output current Iout). Control circuit 50 performs following two controls as characteristic functions. One is a control to cause switching element 43 to perform switching such that ON time Ton which is a period of time during which switching element 43 is kept ON is kept from exceeding an upper limit that is previously determined. The other is a control to raise the above-described upper limit when the AC voltage or the first DC voltage (AC voltage Vac in the present embodiment) detected by detection circuit 30a falls below a predetermined value. It is to be noted that the predetermined value is a value that has been determined previously as a value suitable for detecting momentary power failure or momentary voltage drop that occurs in AC voltage Vac provided to AC/DC converter 20.

As illustrated in FIG. 1, control circuit 50 includes four terminals (terminal ACD connected to detection circuit 30a, terminal GD connected to a gate of switching element 43, terminal CD connected to one end of resistor 44, and terminal ZCD connected to secondary coil 41b of inductor 41). Control circuit 50 detects a zero current using terminal ZCD, detects that a current flowing through switching element 43 reaches a predetermined threshold using terminal CD, and causes switching element 43 to perform switching using terminal GD. In addition, control circuit 50 receives, using terminal ACD, a signal corresponding to AC voltage Vac detected by detection circuit 30a. It is to be noted that the predetermined threshold is a value that has been previously determined as a value corresponding to output current Iout of lighting apparatus 10a.

Figure 2:
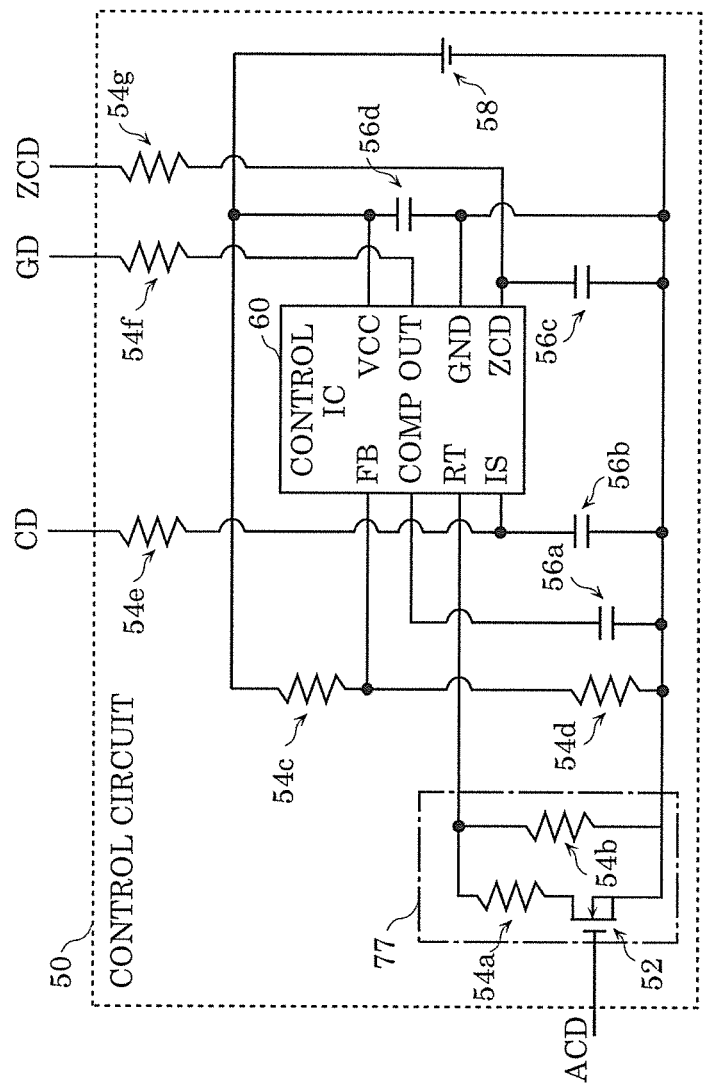
FIG. 2 is a detailed circuit diagram of a control circuit illustrated in FIG. 1.

FIG. 2 is a detailed circuit diagram of control circuit 50 illustrated in FIG. 1. As illustrated in FIG. 2, control circuit 50 includes: transistor 52; resistors 54a to 54g; capacitors 56a to 56c; and control IC 60. It is to be noted that voltage source 58 is a source of a DC voltage generated by DC voltage Vdc output from AC/DC converter 20, AC power supply 12, secondary coil 41b of inductor 41, or additional (tertiary) coil (not illustrated) of inductor 41, for example. Control IC 60 is an IC which causes switching element 43 to perform switching in BCM, and includes eight terminals (terminal FB, terminal COMP, terminal RT, terminal IS, terminal VCC, terminal OUT, terminal GND, and terminal ZCD).

Here, in control circuit 50 illustrated in FIG. 2, characteristic portions are resistors 54a and 54b connected to terminal RT of control IC 60 and transistor 52 (area 77 surrounded by a frame of a dashed-dotted line). Control IC 60 changes the upper limit of ON time Ton of switching element 43 according to a resistance value between terminal RT and terminal GND, more specifically, raises the upper limit as the resistance value is larger. Resistors 54a and 54b are connected in parallel between terminal RT and terminal GND when transistor 52 is ON, and only resistor 54b is connected between terminal RT and terminal GND when transistor 52 is OFF. More specifically, the resistance value between terminal RT and terminal GND is larger when transistor 52 is OFF than when transistor 52 is ON. Accordingly, since the resistance value between terminal RT and terminal GND is larger when transistor 52 is OFF than when transistor 52 is ON, control IC 60 raises the upper limit of ON time Ton of switching element 43.

Figure 3:
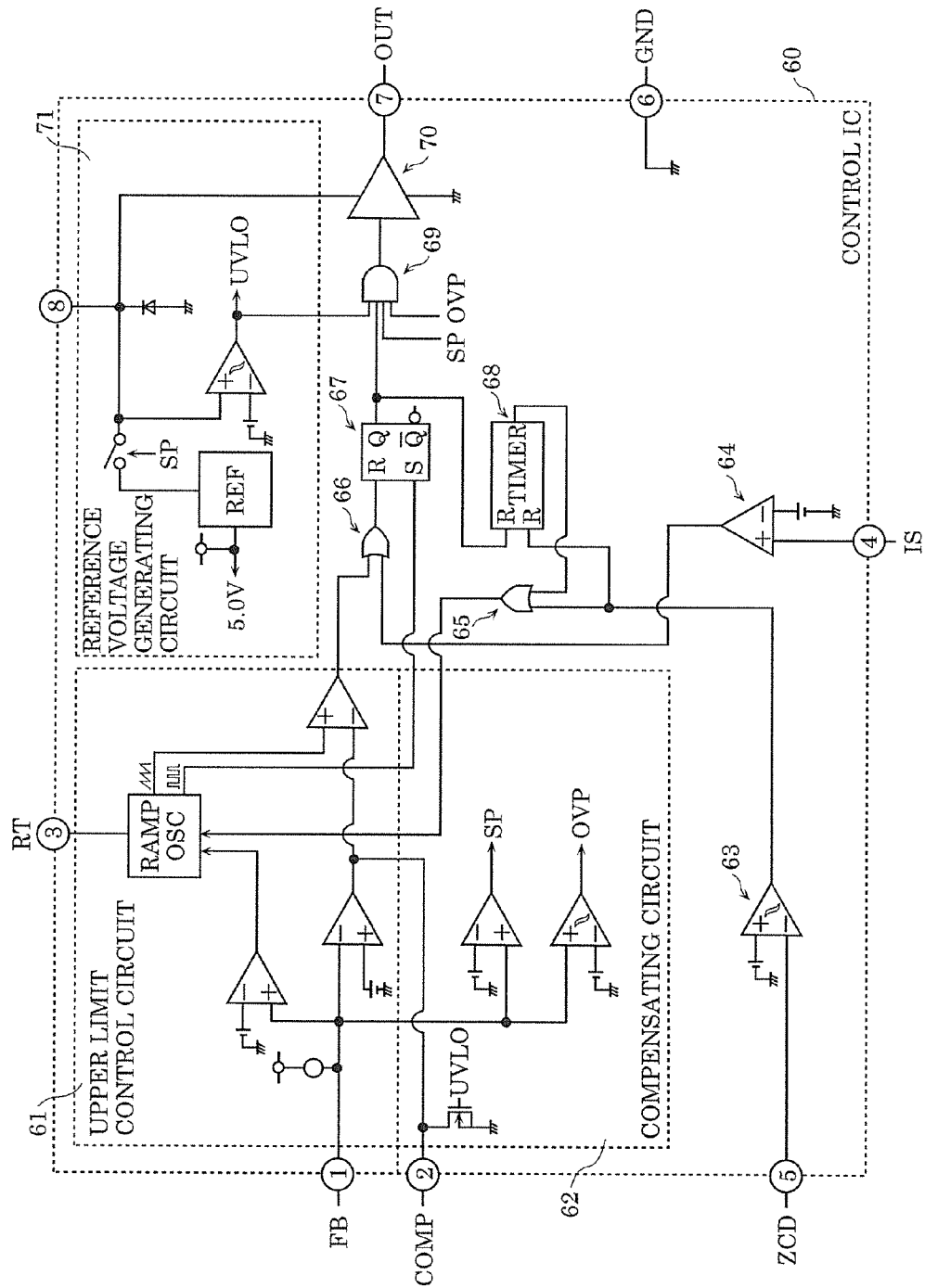
FIG. 3 is a detailed circuit diagram of a control IC illustrated in FIG. 2.

FIG. 3 is a detailed circuit diagram of control IC 60 illustrated in FIG. 2. Control IC 60 includes: upper limit control circuit 61; compensating circuit 62; comparators 63 and 64; OR gates 65 and 66; flip-flop 67; timer 68; AND gate 69; driver 70; and reference voltage generating circuit 71. Control IC 60 is, for example, a power supply control IC "FA5601" manufactured by Fuji Electric Co., Ltd.

In control IC 60, when comparator 63 connected to terminal ZCD via OR gate 65 detects a zero current, a signal indicating the detection of the zero current is provided to upper limit control circuit 61, and the signal is provided to a set terminal (S) of flip-flop 67 from upper limit control circuit 61. As a result, flip-flop 67 is set, an output signal from flip-flop 67 is provided to driver 70 via AND gate 69, and a gate signal for turning ON switching element 43 is output from terminal OUT of control IC 60.

In addition, when comparator 64 connected to terminal IS detects that a current flowing through switching element 43 reaches a predetermined threshold, a signal indicating the detection is provided to a reset terminal (R) of flip-flop 67 via OR gate 66. As a result, flip-flop 67 is reset, an output signal from flip-flop 67 is provided to driver 70 via AND gate 69, and a gate signal for turning OFF switching element 43 is output from terminal OUT of control IC 60.

Meanwhile, in upper limit control circuit 61, a ramp pulse is generated with a ramp corresponding to a resistance value between terminal RT and terminal GND after the zero current is detected, and a result of comparing the lamp pulse and a predetermined voltage is provided to OR gate 66. With this, ON time Ton of switching element 43 is controlled so as not to exceed the upper limit corresponding to the ramp of the ramp pulse. At this time, since a ramp pulse is generated to have a shallower ramp as the resistance value between terminal RT and terminal GND is larger, the upper limit of ON time Ton of switching element 43 is raised.

The reason why the upper limit of ON time Ton is set by upper limit control circuit 61 is to prepare for abnormal operations as described below.

(1) It is prevented that an output voltage of DC/DC converter 40a from becoming excessively high when a load with excessive forward voltage Vf is connected to lighting apparatus 10a. More specifically, when a forward voltage of a solid-state light-emitting device connected to lighting apparatus 10a exceeds a predetermined value (abnormal operation), an output voltage of DC/DC converter 40a is prevented from becoming excessively high.

(2) To prevent sounding caused by excessively increased ON time Ton which causes the switching frequency to decrease and enter an audible frequency band.

(3) To prevent switching element 43 from being kept ON when short-circuit fault occurs to the resistor for detecting a current, such as resistor 44, and disables detection of the peak of current IL.

The following describes an operation of lighting apparatus 10a according to the present embodiment configured as described above.

Here, for facilitating the understanding, an operation of a lighting apparatus according to a comparison example having no function of changing the upper limit of ON time Ton of the switching element will be described, prior to describing the operation of lighting apparatus 10a according to the present embodiment.

Figure 4:
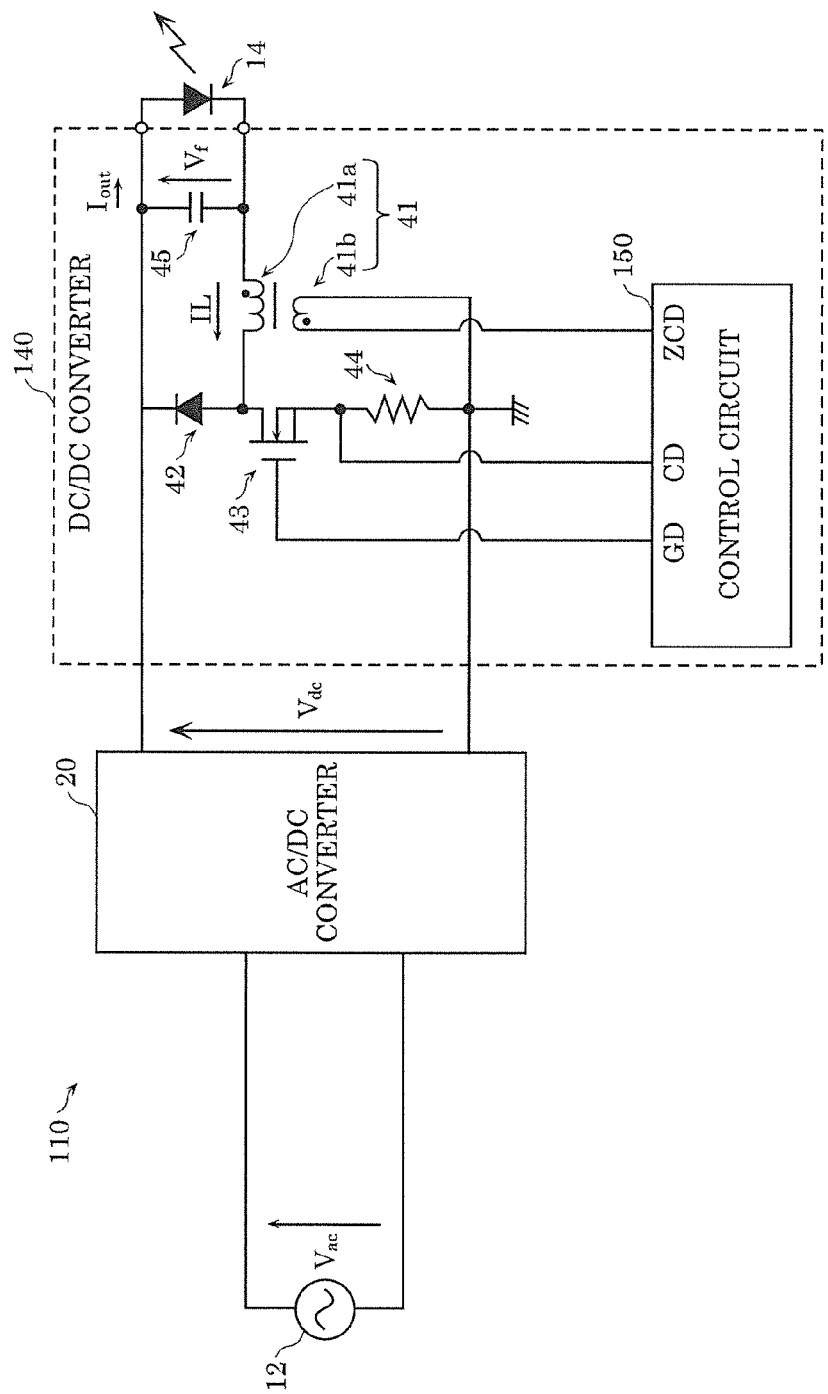
FIG. 4 is a circuit diagram of a lighting apparatus according to a comparison example.
Figure 5:
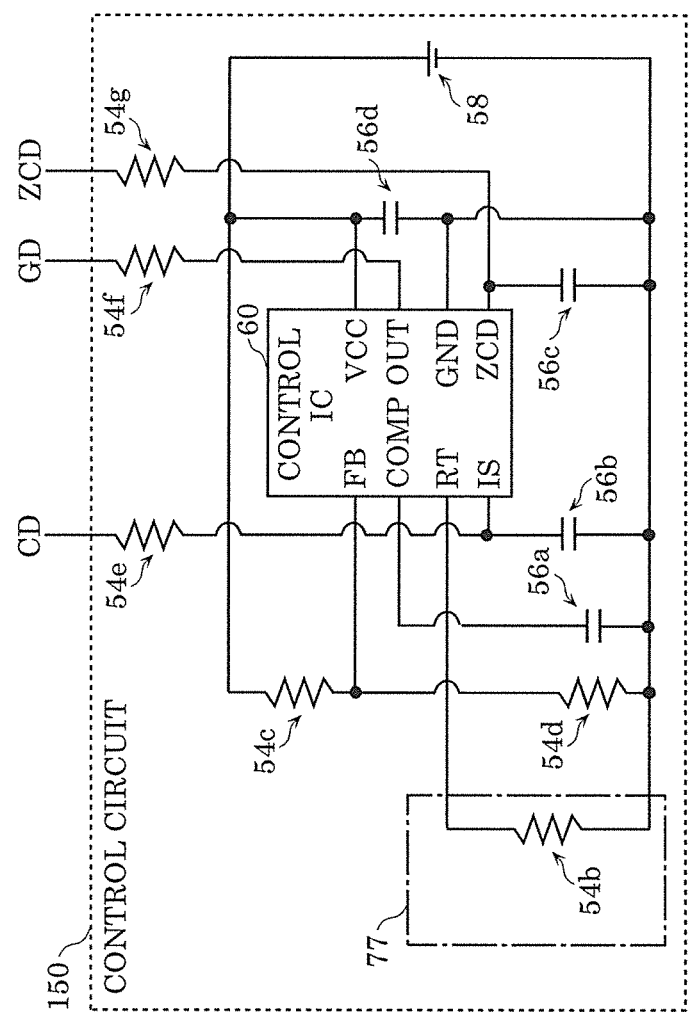
FIG. 5 is a detailed circuit diagram of a control circuit included in a lighting apparatus according to the comparison example.

The lighting apparatus according to the comparison example having no function of changing the upper limit of ON time Ton of the switching element is, for example, lighting apparatus 110 having the configuration of a circuit diagram illustrated in FIG. 4. Lighting apparatus 110 according to the comparison example has a configuration of lighting apparatus 10a according to the present embodiment illustrated in FIG. 1, from which detection circuit 30a is removed. In other words, lighting apparatus 110 includes AC/DC converter 20 and DC/DC converter 140. As illustrated in the circuit diagram in FIG. 5, control circuit 150 included in DC/DC converter 140 corresponds to control circuit 50 according to the present embodiment illustrated in FIG. 2, from which resistor 54a and transistor 52 are removed (see area 77 surrounded by the frame of a dashed-dotted line in each of FIG. 2 and FIG. 5). In FIG. 4 and FIG. 5, the same elements as those in the present embodiment are assigned with the same reference signs, and description is omitted.

Figure 6:
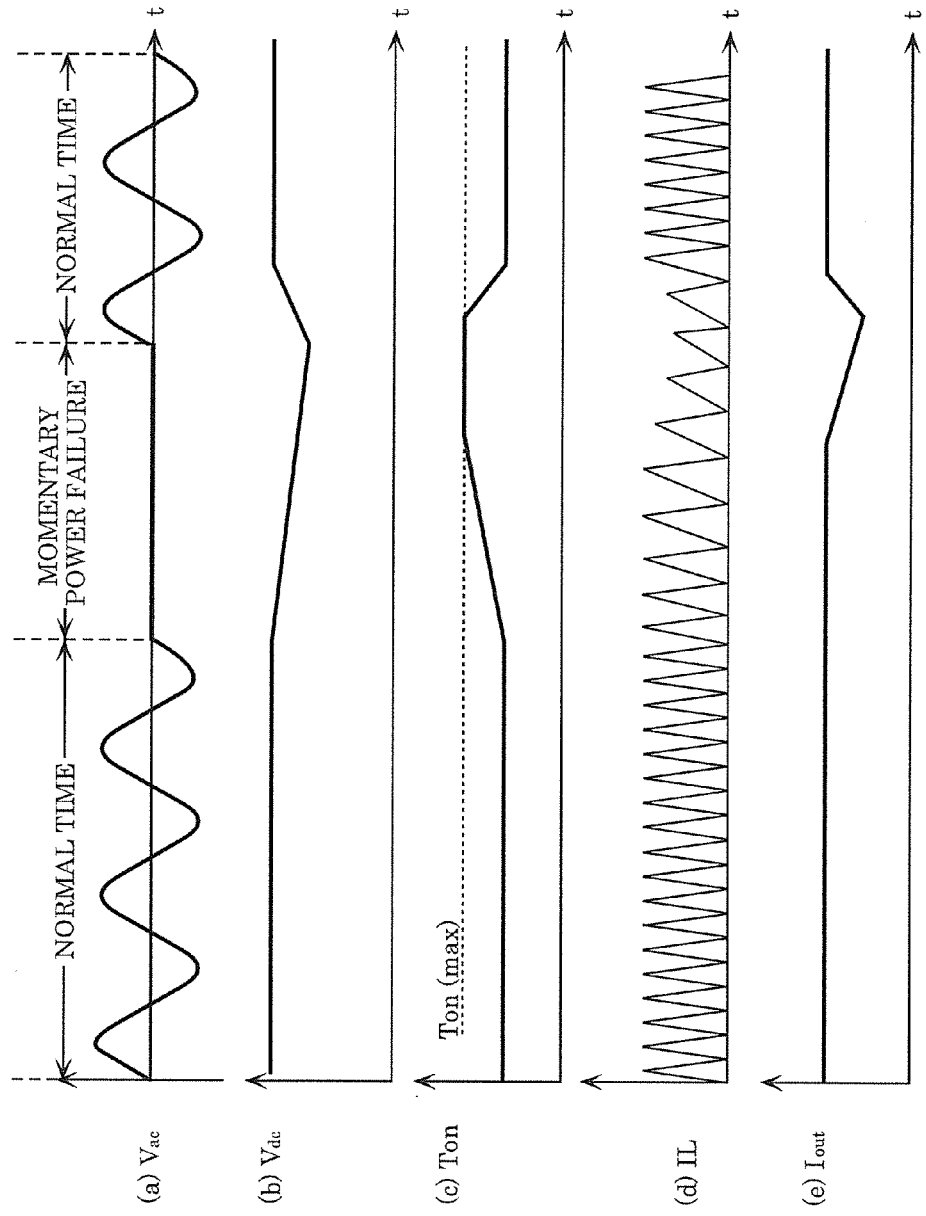
FIG. 6 is a timing chart illustrating an operation of the lighting apparatus according to the comparison example.

FIG. 6 is a timing chart illustrating an operation of lighting apparatus 110 according to the comparison example illustrated in FIG. 4. Signals illustrated in the diagram correspond respectively to signals described in the circuit diagram of FIG. 4. More specifically, in FIG. 6, (a) illustrates waveforms of AC voltage Vac provided to AC/DC converter 20. In FIG. 6, (b) illustrates waveforms of DC voltage Vdc output from AC/DC converter 20. In FIG. 6, (c) illustrates changes over time of ON time Ton of switching element 43. In FIG. 6, (d) illustrates waveforms of current IL flowing through primary coil 41a of inductor 41. In FIG. 6, (e) illustrates waveforms of output current Iout from DC/DC converter 140.

The following describes, with reference to FIG. 6, the operation of lighting apparatus 110 in the case where (1) AC voltage Vac provided to AC/DC converter 20 is constant, and (2) momentary power failure occurs.

(1) The Case Where AC Voltage Vac Provided to AC/DC Converter 20 is Constant

In this case, lighting apparatus 110 performs the operation illustrated in "Normal time" in FIG. 6. More specifically, AC voltage Vac (see (a) in FIG. 6) supplied from AC power supply 12 is converted to DC voltage Vdc by AC/DC converter 20 (see (b) in FIG. 6), and is supplied to DC/DC converter 140.

Under the control of control circuit 150 in DC/DC converter 140, switching element 43 repeatedly is ON for predetermined ON time Ton, and then is OFF for a predetermined OFF time (see (c) in FIG. 6), thereby performing switching in BCM. At this time, in ON time Ton of switching element 43, a current flows through LED 14, primary coil 41a of inductor 41, switching element 43, and resistor 44, and current IL flowing through primary coil 41a in inductor 41 increases. Meanwhile, in the OFF time of switching element 43, the energy accumulated in inductor 41 is released via diode 42, and thereby a current flows through inductor 41, diode 42, and LED 14. As a result, current IL flowing through primary coil 41a of inductor 41 decreases. The switching performed by switching element 43 causes current IL which has a saw-tooth shape (repetition of triangular waves) and a constant peak current value (the above-described predetermined threshold) flows through primary coil 41a of inductor 41 (see (d) in FIG. 6).

The ripple voltage generated in inductor 41 and diode 42 is smoothed by capacitor 45, and as a result, constant output current Iout is supplied to LED 14 (see (e) in FIG. 6).

In order to cause switching element 43 to operate in BCM, control circuit 150 detects the state where current IL flowing through primary coil 41a of inductor 41 reaches zero (zero current) due to a voltage provided to terminal ZCD connected to secondary coil 41b of inductor 41. Upon detecting the zero current, control circuit 150 outputs a control signal for turning ON switching element 43 from terminal GD. In addition, upon detecting that the current flowing through switching element 43 reaches the predetermined threshold according to a voltage provided to terminal CD, control circuit 150 outputs a control signal for turning OFF switching element 43 from terminal GD.

(2) The Case Where Momentary Power Failure Occurs

In this case, lighting apparatus 110 performs the operation illustrated in "Momentary power failure" in FIG. 6. More specifically, since supply of AC voltage Vac to AC/DC converter 20 is stopped (see (a) in FIG. 6), DC voltage Vdc output from AC/DC converter 20 decreases over time (see (b) in FIG. 6).

In DC/DC converter 140, as DC voltage Vdc decreases, ON time Ton of switching element 43 increases according to the above-described Expression 1, and when ON time Ton reaches upper limit Ton (max), the state is maintained (see (c) in FIG. 6). As a result, current IL flowing through primary coil 41a of inductor 41 is restricted not by the peak control (control for keeping the peak value constant) but by upper limit Ton (max) of ON time Ton, and the peak value decreases (see (d) in FIG. 6).

As a result, output current Iout from DC/DC converter 140 temporarily decreases (see (e) in FIG. 6), and light emission of LED 14 temporarily decreases, leading to flickering.

As to ON time Ton of switching element 43, control IC 60 controls the switching of switching element 43 such that ON time Ton is kept from exceeding upper limit Ton (max) of ON time Ton which corresponds to resistor 54b connected to terminal RT.

An operation of lighting apparatus 110 according to the comparison example at the time of momentary voltage drop is the same as the operation of lighting apparatus 110 at the time of momentary power failure as described above.

As described above, in lighting apparatus 110 according to the comparison example, light emission of LED 14 temporarily decreases when momentary power failure or momentary voltage drop occurs, leading to flickering.

Next, the operation of lighting apparatus 10a according to the present embodiment will be described.

Lighting apparatus 10a according to the present embodiment includes at least the elements included by lighting apparatus 110 according to the comparison example, and therefore has at least the functions of lighting apparatus 110 according to the comparison example. However, lighting apparatus 10a according to the present embodiment is different from lighting apparatus 110 according to the comparison example in that lighting apparatus 10a further includes detection circuit 30a, and that control circuit 50 has a function of processing a signal from detection circuit 30a. The following describes the difference between lighting apparatus 10a according to the present embodiment and lighting apparatus 110 according to the comparison example.

Figure 7:
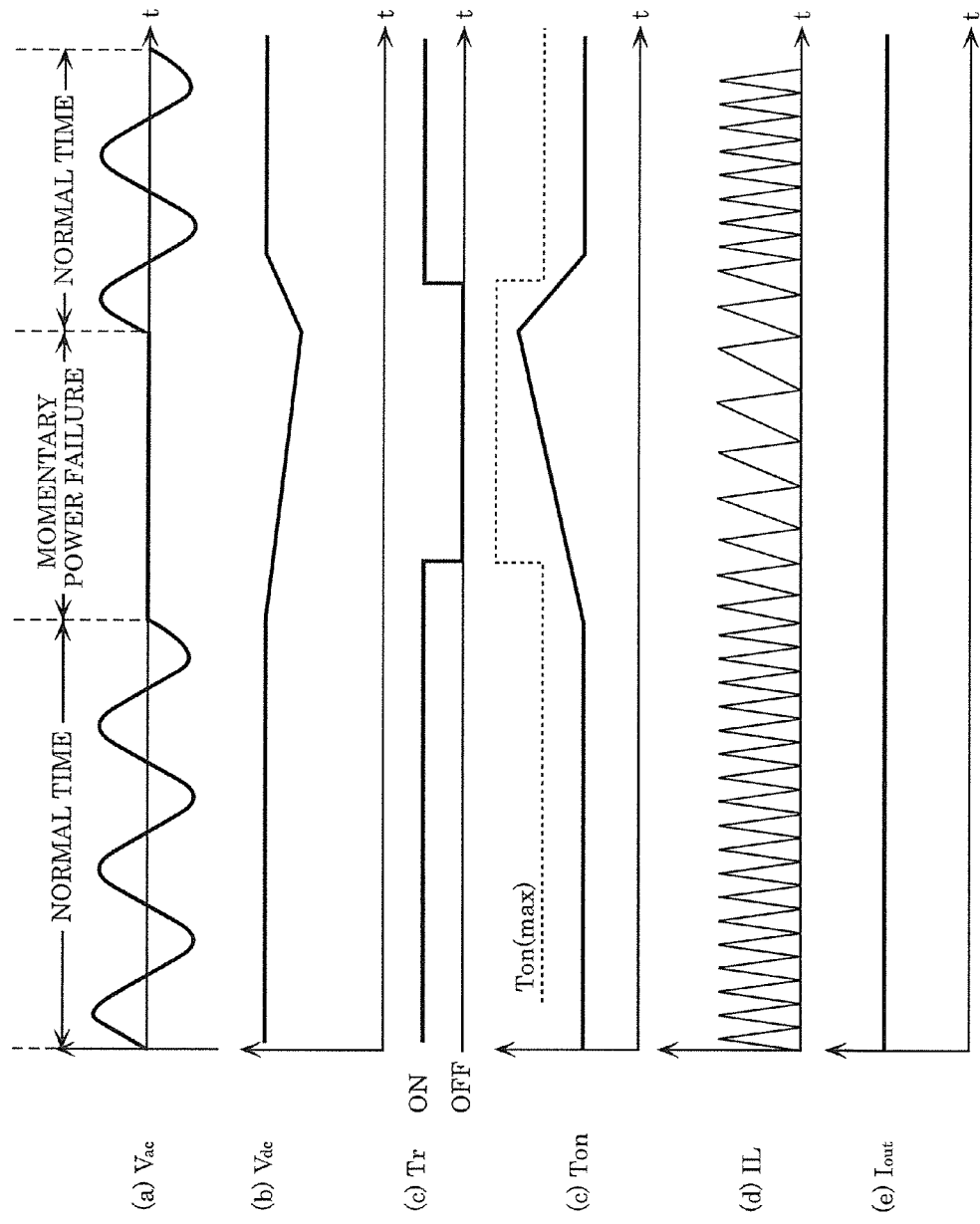
FIG. 7 is a timing chart illustrating an operation of the lighting apparatus according to Embodiment 1 of the present disclosure.

FIG. 7 is a timing chart illustrating the operation of lighting apparatus 10a according to the present embodiment. FIG. 7 further includes a timing chart illustrating the state of transistor 52 in control circuit 50 ((c) in FIG. 7) in addition to FIG. 6 according to the comparison example. More specifically, (a), (b), and (d) to (f) of FIG. 7 correspond to (a) to (e) of FIG. 6, respectively, and (c) of FIG. 7 illustrates the state of transistor 52 in control circuit 50.

As seen from comparison between FIG. 7 and FIG. 6, the operations at the time of momentary power failure differ between the present embodiment and the comparison example. According to the present embodiment, when momentary power failure occurs (see (a) and (b) in FIG. 7), the DC voltage which is output from detection circuit 30a that rectifies and smoothes AC voltage Vac, and is provided to terminal ACD of control circuit 50 decreases. As a result, transistor 52 which is connected to terminal ACD of control circuit 50 and has been ON is turned OFF (see (c) in FIG. 7).

When transistor 52 is turned OFF, only resistor 54b remains among resistors connected between terminal RT and terminal GND of control IC 60, and thus a resistance value between terminal RT and terminal GND increases. As a result, control IC 60 changes upper limit Ton (max) of ON time Ton of switching element 43 to be increased.

With this, ON time Ton increases to exceed upper limit Ton (max) without being restricted by upper limit Ton (max) (see (d) in FIG. 7). As a result, current IL flowing through primary coil 41a of inductor 41 is maintained at a constant value without a decrease (see (e) in FIG. 7), allowing the peak control (control for keeping the peak value constant) to be maintained. Accordingly, output current Iout from DC/DC converter 40a is kept constant (see (f) in FIG. 7), in other words, light emission of LED 14 is kept constant, causing no flickering.

An operation of lighting apparatus 10a according to the present embodiment at the time of momentary voltage drop is the same as the operation of lighting apparatus 10a at the time of momentary power failure as described above.

As described above, with lighting apparatus 10a according to the present embodiment, light emission of LED 14 is kept constant even when momentary power failure or momentary voltage drop occurs, causing no flickering.

It should be understood that, when supply of AC voltage Vac of input is stopped not momentary but for a longer amount of time, ON time Ton of switching element 43 reaches changed upper limit Ton (max), and thus the peak control is not maintained, leading to possible flickering. Even in this case, with lighting apparatus 10*a* according to the present embodiment, flickering starts at a later time compared to lighting apparatus 110 according to the comparison example, and as a result, the period in which flickering occurs is reduced.

Embodiment 2

Next, a lighting apparatus according to Embodiment 2 of the present disclosure will be described.

Figure 8:
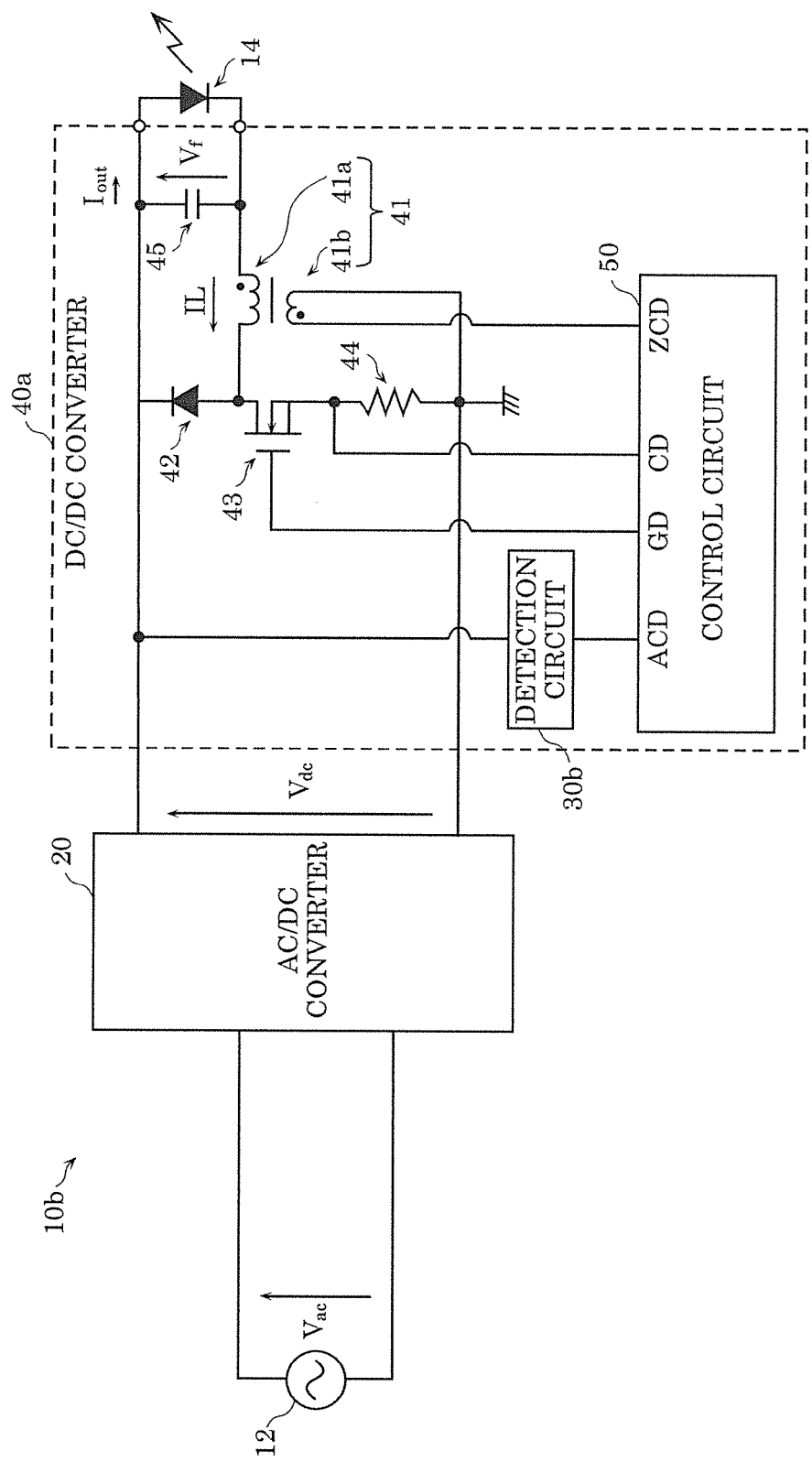
FIG. 8 is a circuit diagram of a lighting apparatus according to Embodiment 2 of the present disclosure.

FIG. 8 is a circuit diagram of lighting apparatus 10*b* according to Embodiment 2 of the present disclosure. Lighting apparatus 10*b* is an apparatus which supplies a current to LED 14, and includes AC/DC converter 20, detection circuit 30*b*, and DC/DC converter 40*a*. Compared to lighting apparatus 10*a* according to Embodiment 1, lighting apparatus 10*b* includes detection circuit 30*b* of a different type. In the following description, the same elements as those in Embodiment 1 are assigned with the same reference signs, and description is omitted (the same holds true for the subsequent embodiments).

Figure 9:
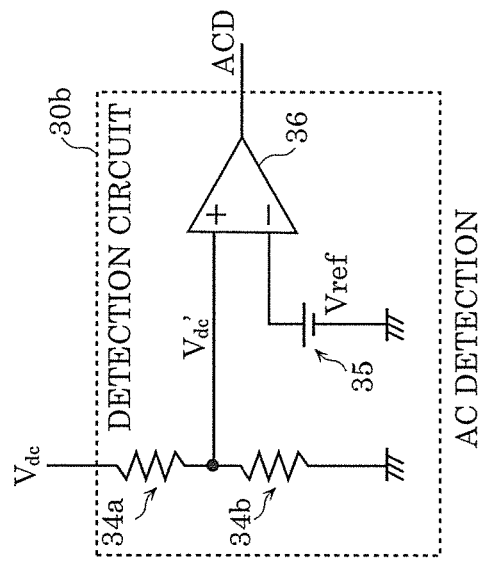
FIG. 9 is a circuit diagram of a detection circuit included in the lighting apparatus according to Embodiment 2 of the present disclosure.

Detection circuit 30*b* is an example of a circuit which detects an AC voltage provided to AC/DC converter 20 or a first DC voltage output from AC/DC converter 20, and detects DC voltage Vdc output from AC/DC converter 20, according to the present embodiment. Detection circuit 30*b* includes resistors 34*a* and 34*b*, reference voltage generating unit 35, and comparator 36, as illustrated in FIG. 9.

With detection circuit 30*b* described above, DC voltage Vdc output from AC/DC converter 20 is divided by resistor 34*a* and resistor 34*b*, and the voltage which has been divided and reference voltage Vref generated by reference voltage generating unit 35 are compared by comparator 36. As a result, when DC voltage Vdc output from AC/DC converter 20 falls below a predetermined value, a signal indicating that effect is output from comparator 36 and provided to terminal ACD of control circuit 50. It is to be noted that the predetermined value is a value that is previously determined as a value suitable for detecting momentary power failure or momentary voltage drop that occurs in AC voltage Vac provided to AC/DC converter 20.

Control circuit 50 provided with the signal into terminal ACD operates in the same manner as Embodiment 1. More specifically, when comparator 36 of detection circuit 30*b* detects that DC voltage Vdc has fallen below the predetermined value, control circuit 50 raises upper limit Ton (max) of ON time Ton of switching element 43.

As a result, as with Embodiment 1, light emission of LED 14 is kept constant even when momentary power failure or momentary voltage drop occurs, causing no flickering (or suppressing occurrence of flickering).

Embodiment 3

Next, a lighting apparatus according to Embodiment 3 of the present disclosure will be described.

Figure 10:
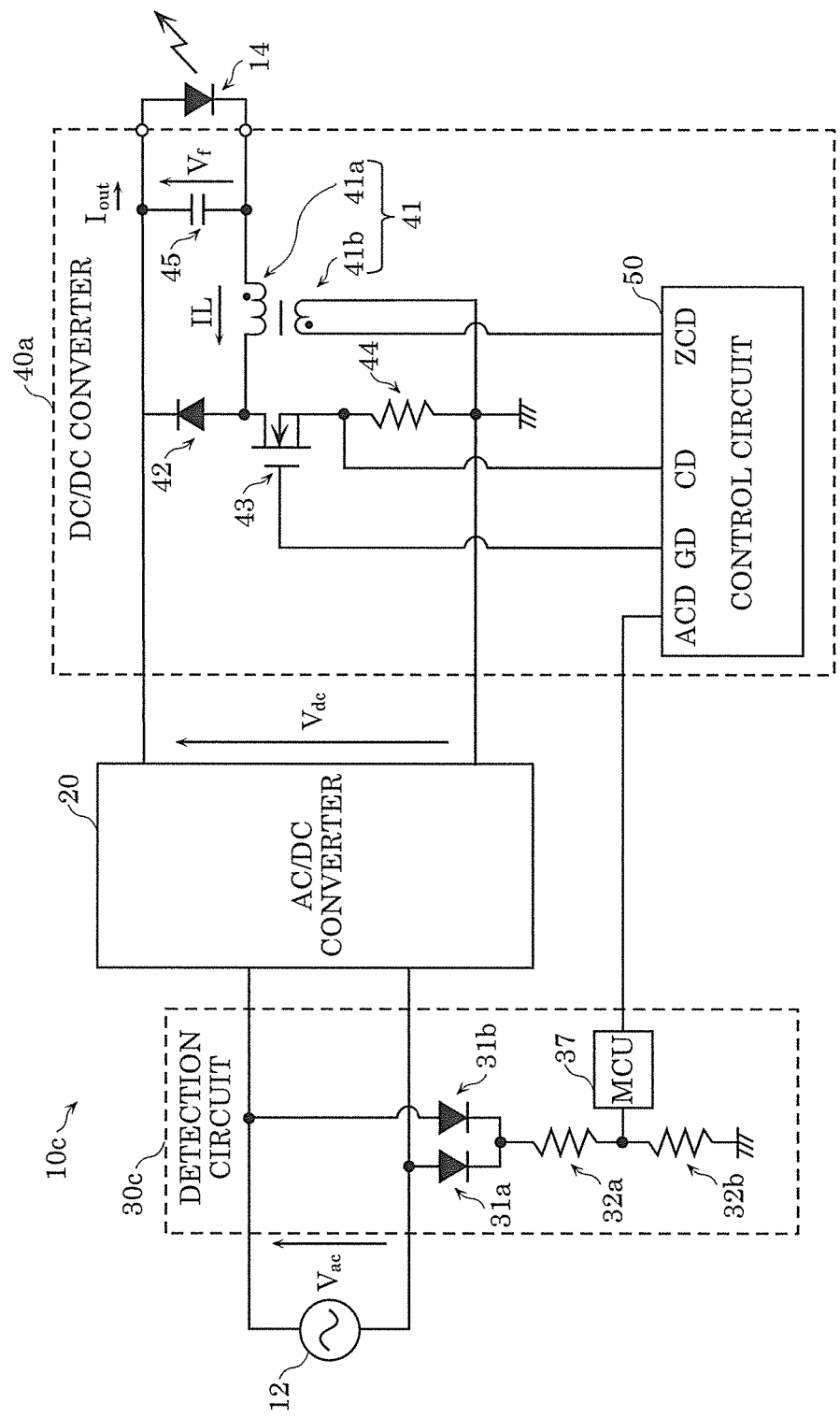
FIG. 10 is a circuit diagram of a lighting apparatus according to Embodiment 3 of the present disclosure.

FIG. 10 is a circuit diagram of lighting apparatus 10*c* according to Embodiment 3 of the present disclosure. Lighting apparatus 10*c* is an apparatus which supplies a current to LED 14, and includes AC/DC converter 20, detection circuit 30*c*, and DC/DC converter 40*a*. Compared to lighting apparatus 10*a* according to Embodiment 1, lighting apparatus 10*c* includes detection circuit 30*c* of a different type.

Detection circuit 30*c* is an example of a circuit which detects an AC voltage provided to AC/DC converter 20 or a first DC voltage output from AC/DC converter 20, and detects AC voltage Vac provided to AC/DC converter 20 according to the present embodiment. As illustrated in FIG. 10, detection circuit 30*c* includes rectifiers (diodes 31*a* and 31*b*) which converts an AC voltage to a DC voltage, voltage dividers (resistors 32*a* and 32*b*), and MCU (microcomputer) 37.

According to detection circuit 30*c*, AC voltage Vac provided to AC/DC converter 20 is rectified by the rectifiers (diodes 31*a* and 31*b*) and divided by the voltage dividers (resistors 32*a* and 32*b*), and the voltage which has been divided is provided to MCU 37. MCU 37 is an example of a microcomputer which monitors the DC voltage output from the rectifier that rectifies AC voltage Vac, and when the DC voltage falls below a predetermined value, outputs a detection signal indicating that effect to control circuit 50. According to the present embodiment, MCU 37 converts a DC voltage which has been rectified and divided in detection circuit 30*c*, to a digital value by a built-in A/D converter, and determines whether or not the obtained digital value falls below a predetermined value. It is to be noted that the predetermined value is a value that is previously determined as a value suitable for detecting momentary power failure or momentary voltage drop that occurs in AC voltage Vac provided to AC/DC converter 20.

When it is determined that the digital value falls below the predetermined value, MCU 37 outputs to control circuit 50 a detection signal indicating that effect; that is, indicating the fact that AC voltage Vac provided to AC/DC converter 20 falls below the predetermined value.

The detection signal output from MCU 37 is provided to terminal ACD of control circuit 50, and control circuit 50 operates in the same manner as Embodiment 1, upon receiving the detection signal. More specifically, when receiving from detection circuit 30*c* the detection signal indicating that AC voltage Vac provided to AC/DC converter 20 falls below a predetermined value, control circuit 50 raises upper limit Ton (max) of ON time Ton of switching element 43.

As a result, as with Embodiment 1, light emission of LED 14 is kept constant even when momentary power failure or momentary voltage drop occurs, causing no flickering (or suppressing occurrence of flickering).

Embodiment 4

Next, a lighting apparatus according to Embodiment 4 of the present disclosure will be described.

Figure 11:
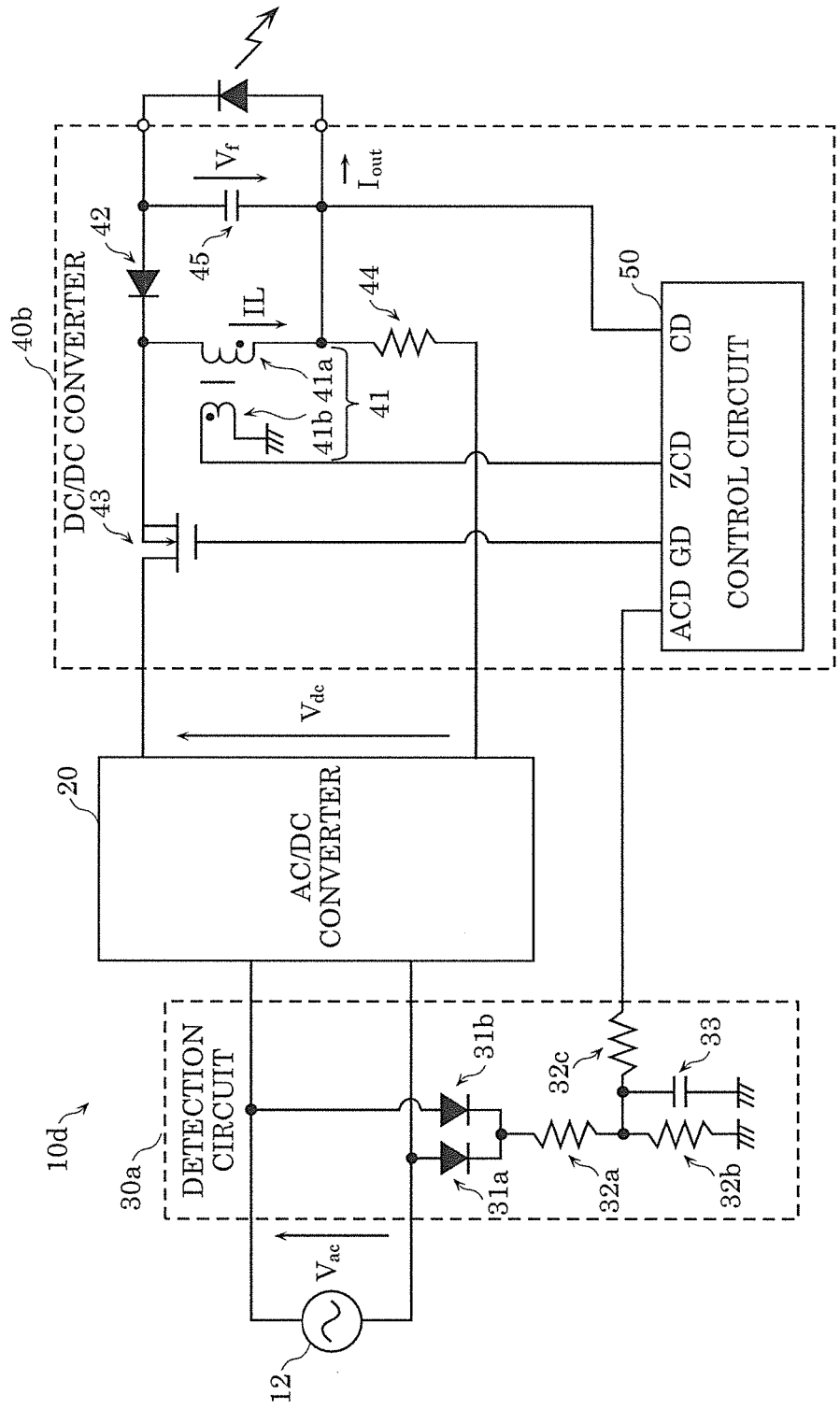
FIG. 11 is a circuit diagram of a lighting apparatus according to Embodiment 4 of the present disclosure.

FIG. 11 is a circuit diagram of lighting apparatus 10*d* according to Embodiment 4 of the present disclosure. Lighting apparatus 10*d* is an apparatus which supplies a current to LED 14, and includes AC/DC converter 20, detection circuit 30*a*, and DC/DC converter 40*b*. Compared to lighting apparatus 10*a* according to Embodiment 1, lighting apparatus 10*d* includes DC/DC converter 40*b* of a different type.

DC/DC converter 40*b* is an example of a circuit which converts the first DC voltage to a second DC voltage to be applied to a solid-state light-emitting device, and is a buck-boost converter which converts DC voltage Vdc to a DC voltage to be applied to LED 14 (forward voltage Vf of LED 14), according to the present embodiment. DC/DC converter 40*b* includes: inductor 41; diode 42; switching element 43; resistor 44; capacitor 45; and control circuit 50. DC/DC converter 40*a* in Embodiment 1 is a buck converter. However, DC/DC converter 40*b* in the present embodiment is a buck-boost converter. Circuit components included in DC/DC converter 40b are the same as circuit components in Embodiment 1. However, connection is different from connection in Embodiment 1, as illustrated in FIG. 11.

With DC/DC converter 40b, in ON time Ton of switching element 43, a current flows through switching element 43, primary coil 41a of inductor 41, and resistor 44, and current IL flowing through primary coil 41a in inductor 41 increases. Meanwhile, in the OFF time of switching element 43, the energy accumulated in inductor 41 is released via LED 14 diode 42, and thereby a current flows through inductor 41, LED 14, and diode 42. As a result, current IL flowing through primary coil 41a of inductor 41 decreases. However, switching element 43 performs switching in BCM as with Embodiment 1.

Lighting apparatus 10d having the above-described configuration according to the present embodiment includes detection circuit 30a and control circuit 50 having the same functions as those in Embodiment 1, and thus operates in the same manner as Embodiment 1 at the time of momentary power failure or momentary voltage drop. As a result, as with Embodiment 1, light emission of LED 14 is kept constant even when momentary power failure or momentary voltage drop occurs, causing no flickering (or suppressing occurrence of flickering).

It is to be noted that, although lighting apparatus 10d includes detection circuit 30a equivalent to Embodiment 1 according to the present embodiment, lighting apparatus 10d may include detection circuit 30b described in Embodiment 2, or detection circuit 30c described in Embodiment 3, instead of detection circuit 30a.

Embodiment 5

Next, a lighting apparatus according to Embodiment 5 of the present disclosure will be described.

Figure 12:
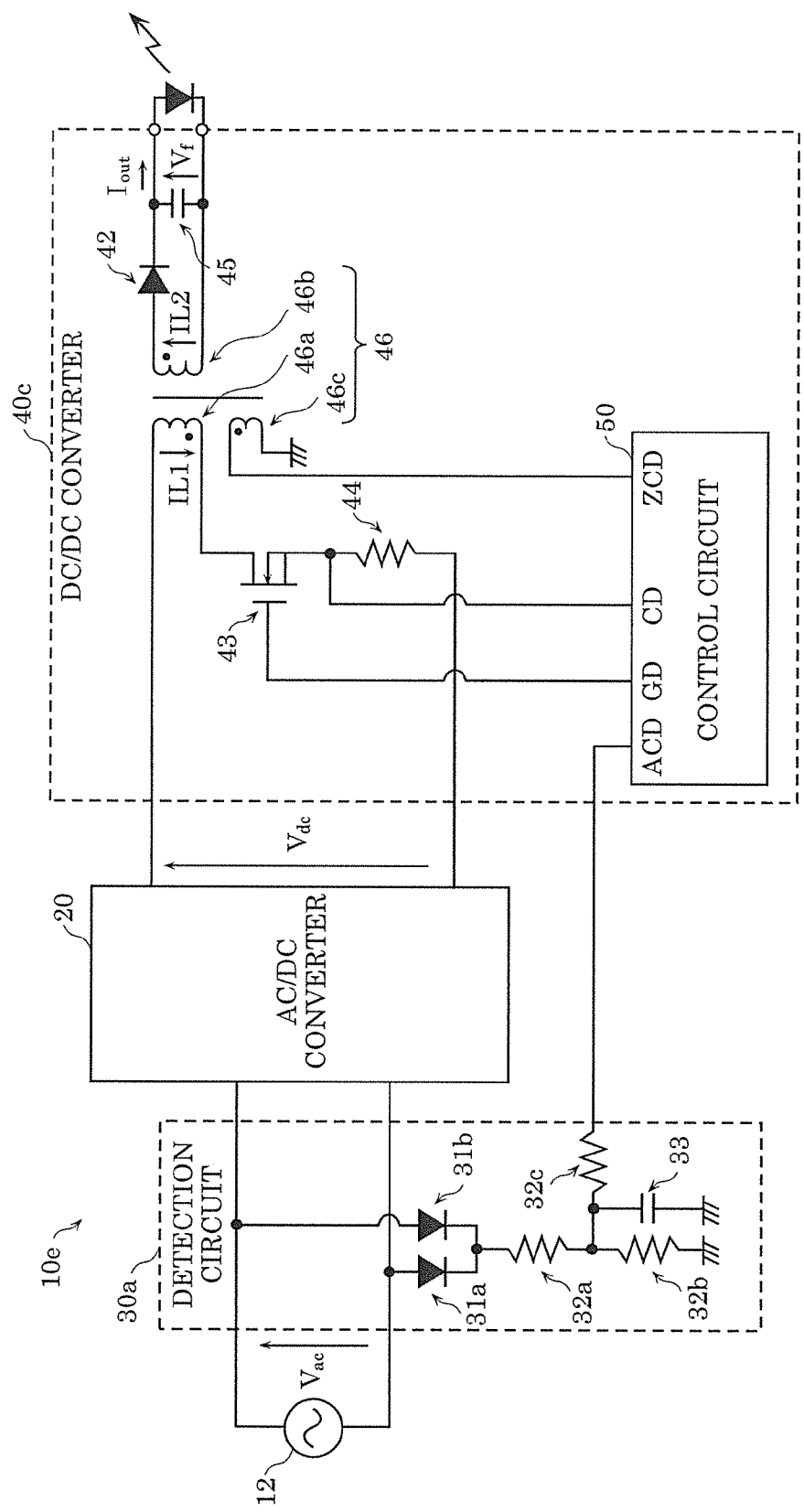
FIG. 12 is a circuit diagram of a lighting apparatus according to Embodiment 5 of the present disclosure.

FIG. 12 is a circuit diagram of lighting apparatus 10e according to Embodiment 5 of the present disclosure. Lighting apparatus 10e is an apparatus which supplies a current to LED 14, and includes AC/DC converter 20, detection circuit 30a, and DC/DC converter 40c. Compared to lighting apparatus 10a according to Embodiment 1, lighting apparatus 10e includes DC/DC converter 40c of a different type.

DC/DC converter 40c is an example of a circuit which converts the first DC voltage to a second DC voltage to be applied to a solid-state light-emitting device, and is a flyback converter which converts DC voltage Vdc to a DC voltage to be applied to LED 14 (forward voltage Vf of LED 14), according to the present embodiment. DC/DC converter 40c includes: inductor 46; diode 42; switching element 43; resistor 44; capacitor 45; and control circuit 50. DC/DC converter 40a of Embodiment 1 is a buck converter. However, DC/DC converter 40c of the present embodiment is a flyback converter. Circuit components included in DC/DC converter 40c are the same types as the circuit components in Embodiment 1. However, connection and a type of inductor 46 are different from those in Embodiment 1, as illustrated in FIG. 12.

According to the present embodiment, inductor 46 is a choke trans, and includes: primary coil 46a which accumulates and releases energy according to switching of switching element 43; secondary coil 46b which generates induced electromotive force; and auxiliary coil 46c for detecting a zero current. Secondary coil 46b is connected to diode 42, capacitor 45, and LED 14 so that the induced electromotive force generated in secondary coil 46b is supplied to LED 14 via diode 42. In addition, auxiliary coil 46c is connected to terminal ZCD of control circuit 50.

With DC/DC converter 40c, in ON time Ton of switching element 43, a current flows through primary coil 46a of inductor 46, switching element 43, and resistance 44, and thereby current IL1 flows through primary coil 41a of inductor 46. Meanwhile, in the OFF time of switching element 43, the energy accumulated in secondary coil 46b of inductor 46 is released via diode 42, and thereby current IL2 flows through secondary coil 46b of inductor 46, diode 42, and LED 14. A current flowing through inductor 46 is detected by auxiliary coil 46c, and control circuit 50 detects the state where the current flowing through inductor 46 reaches zero (zero current).

It is to be noted that switching element 43 performs switching in BCM as with Embodiment 1. In addition, current IL illustrated in (e) in FIG. 7 corresponds to a current flowing through inductor 46 (current flowing through primary coil 41a and secondary coil 46b) according to the present embodiment.

Lighting apparatus 10e having the above-described configuration according to the present embodiment includes detection circuit 30a and control circuit 50 having the same functions as those in Embodiment 1, and thus operates in the same manner as Embodiment 1 at the time of momentary power failure or momentary voltage drop. As a result, as with Embodiment 1, light emission of LED 14 is kept constant even when momentary power failure or momentary voltage drop occurs, causing no flickering (or suppressing occurrence of flickering).

It is to be noted that, although lighting apparatus 10e includes detection circuit 30a equivalent to Embodiment 1 according to the present embodiment, lighting apparatus 10e may include detection circuit 30b described in Embodiment 2 or detection circuit 30c described in Embodiment 3, instead of detection circuit 30a.

Embodiment 6

Next, a lighting apparatus according to Embodiment 6 of the present disclosure will be described.

Figure 13:
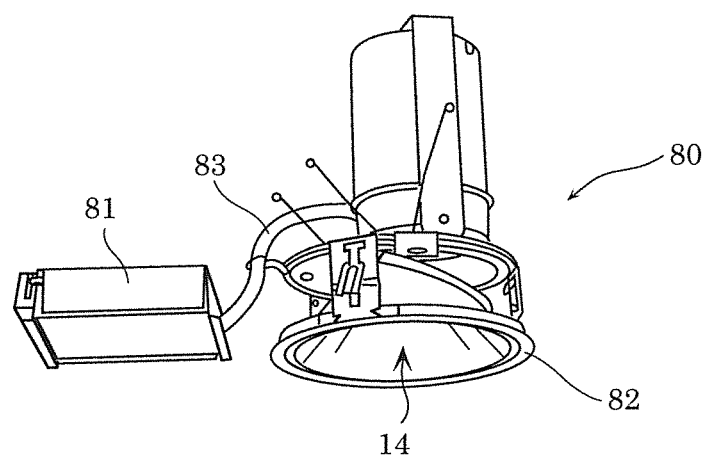
FIG. 13 is an external view of a luminaire according to Embodiment 6 of the present disclosure.

FIG. 13 is an external view of luminaire 80 according to Embodiment 6 of the present disclosure. Luminaire 80 includes any one of lighting apparatuses 10a to 10e according to Embodiments 1 to 5 described above, and LED 14 which is supplied with a current from the lighting apparatus. According to the present embodiment, luminaire 80 is a downlight including: circuit box 81 which houses the lighting apparatus; lighting body 82 to which LED 14 is attached; and line 83 electrically connecting circuit box 81 and LED 14 of lighting body 82.

Luminaire 80 as described above includes one of lighting apparatuses 10a to 10e according to Embodiments 1 to 5 described above, and therefore light emission of LED 14 is kept constant even when momentary power failure or momentary voltage drop occurs, causing no flickering (or, suppressing occurrence of flickering).

The lighting apparatus and the luminaire according to the present disclosure have been described based on Embodiments 1 to 6, however the present disclosure is not limited to the above-described embodiments. Other forms in which various modifications apparent to those skilled in the art are applied to the embodiment, or forms structured by combining elements of different embodiments are included within the scope of the present disclosure, unless such changes and modifications depart from the scope of the present disclosure.

For example, although an LED is employed as an example of a solid-state light-emitting device in Embodiments 1 to 6 described above, the solid-state light-emitting device is not limited an LED, and may be a solid-state light-emitting device of a different type such as an organic EL (organic electro-luminescence) device.

In addition, a solid-state light-emitting device is not limited to a single LED, and a plurality of LEDs may be included. The plurality of LEDs may be connected in series, in parallel, or in a mixed manner thereof, may be a module in which the plurality of LEDs are connected, or may include a plurality of modules.

Furthermore, the DC/DC converter according to Embodiments 1 to 6 described above is not limited to a buck converter, a buck-boost converter, or a flyback converter, and may be a converter of a different type such as a boost converter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus which supplies a current to a solid-state light-emitting device, the lighting apparatus comprising:
    an AC/DC converter which converts an AC voltage to a first DC voltage by rectifying and smoothing the AC voltage;
    a DC/DC converter which converts the first DC voltage to a second DC voltage to be applied to the solid-state light-emitting device; and
    a detection circuit which detects at least one of the AC voltage and the first DC voltage,
    wherein the DC/DC converter includes a switching element, and a control circuit that performs a control of repeatedly turning on and off the switching element in a boundary conduction mode, and
    the control circuit performs the control under which an ON time is kept from exceeding an upper limit that is previously determined, and raises the upper limit when the at least one of the AC voltage and the first DC voltage detected by the detection circuit falls below a predetermined value, the ON time being a period of time during which switching element is kept ON,
    the detection circuit includes a rectifier which converts the AC voltage to a DC voltage by rectifying and smoothing the AC voltage, and
    the control circuit raises the upper limit when the DC voltage output from the rectifier falls below the predetermined value.

2. The lighting apparatus according to claim 1, wherein the detection circuit further includes a microcomputer which monitors the DC voltage output from the rectifier, and outputs a detection signal when the DC voltage falls below the predetermined value, and
    the control circuit raises the upper limit when the detection signal is output from the microcomputer.

3. The lighting apparatus according to claim 1, wherein the detection circuit includes a comparator which detects that the first DC voltage has fallen below the predetermined value, and
    the control circuit raises the upper limit when the comparator detects that the first DC voltage has fallen below the predetermined value.

4. The lighting apparatus according to claim 1, wherein the control circuit performs the control under which the ON time is kept from exceeding the upper limit when an abnormal operation occurs in the lighting apparatus, and
    the abnormal operation is a state where the solid-state light-emitting device has a forward voltage exceeding a predetermined value.

5. The lighting apparatus according to claim 1, wherein the DC/DC converter is a buck converter.

6. The lighting apparatus according to claim 1, wherein the DC/DC converter is a buck-boost converter.

7. The lighting apparatus according to claim 1, wherein the DC/DC converter is a flyback converter.

8. A luminaire comprising:
    the lighting apparatus according to claim 1; and
    a solid-state light-emitting device which is supplied with a current by the lighting apparatus.

9. The lighting apparatus according to claim 1, wherein the control circuit includes a ramp pulse generator which generates a ramp pulse, and raises the upper limit by increasing a ramp of the ramp pulse.

* * * * *